United States Patent
Vazquez et al.

(10) Patent No.: US 11,946,534 B1
(45) Date of Patent: Apr. 2, 2024

(54) CLOSURE FOR MICRO TORQUE CONVERTER

(71) Applicant: Schaeffler Technologies AG & Co. KG, Herzogenaurach (DE)

(72) Inventors: Erick Arturo Vazquez, Puebla (MX); Steven Olsen, Wooster, OH (US); Victor Alejandro Reyna, Huejotzingo (MX)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/197,362

(22) Filed: May 15, 2023

(51) Int. Cl.
*F16H 41/28* (2006.01)
*F16H 41/24* (2006.01)

(52) U.S. Cl.
CPC ....... *F16H 41/28* (2013.01); *F16H 2041/243* (2013.01)

(58) Field of Classification Search
CPC .......................... F16H 2041/243; F16H 41/28; B23K 15/0006
See application file for complete search history.

(56) References Cited

U.S. PATENT DOCUMENTS

| | | | | |
|---|---|---|---|---|
| 4,833,295 A | * | 5/1989 | Locker | F16H 41/24 219/121.13 |
| 4,867,641 A | * | 9/1989 | Okuno | F16H 41/24 219/137 R |
| 2016/0290461 A1 | * | 10/2016 | Momiyama | F16H 41/28 |

FOREIGN PATENT DOCUMENTS

DE 19755168 A1 * 6/1999 ........... B23K 26/242

* cited by examiner

*Primary Examiner* — Richard M Lorence
*Assistant Examiner* — Aimee Tran Nguyen
(74) *Attorney, Agent, or Firm* — Volpe Koenig

(57) ABSTRACT

A torque converter assembly having a cover including a tubular body, and a pump including a shell. The shell of the pump is received in the tubular body of the cover, and the shell of the pump is joined to the cover with a circumferential weld. The tubular body of the cover can include a circumferentially extending groove, and the circumferential weld can be at least partially aligned in an axial direction with the groove.

14 Claims, 5 Drawing Sheets

CLOSURE FOR MICRO TORQUE CONVERTER

TECHNICAL FIELD

The present disclosure is directed to a torque converter, and is more particularly related to a micro torque converter.

BACKGROUND

Torque converter assemblies are well known. Torque converter assemblies generally include a front cover and a pump cover enclosing internal components, such as a lock-up clutch.

Connection between the various components of a torque converter assembly can be complicated, and require significant labor costs and assembly time.

Accordingly, it would be desirable to provide an improved configuration for a torque converter assembly that provides manufacturing and assembly efficiencies while improving performance.

SUMMARY

A torque converter assembly having a cover housing and a pump received in the cover, wherein the pump is welded directly to the cover.

In accordance with one aspect, a torque converter assembly comprises a cover including a tubular body, and a pump including a shell. The shell of the pump is received in the tubular body of the cover, and the shell of the pump is joined to the cover with a circumferential weld.

The tubular body of the cover can include a circumferentially extending groove, and the circumferential weld can be at least partially aligned in an axial direction with the groove. The groove can have a depth in a radial direction of between 0.5 mm and 1.5 mm. The shell of the pump can include a circumferentially extending flange, and the circumferential weld can extend between the flange and the tubular body of the cover. The flange can be at least partially aligned in the axial direction with the groove. The groove can have an axial length that is greater than an axial length of the flange. The flange can be centered along the axial direction with respect to the axial length of the groove. The groove can have an axial length between approximately 7 mm to 11 mm. A ratio of the axial length of the flange to the axial length of the groove can have a range of approximately 0.5 to 1.

In accordance with another aspect, a method of making a torque converter assembly comprises providing a cover including a tubular body, providing a pump including a shell, machining at least one of an inside diameter of the tubular body or the outer diameter of the shell of the pump, positioning the shell of the pump in the tubular body of the cover, and joining the shell of the pump to the cover by welding to form a weld therebetween.

The method can include forming a circumferentially extending groove in a radially outer surface of the tubular body of the cover, and joining the shell of the pump to the cover by welding at least partially within the groove. The groove can have a depth in a radial direction of the groove of between 0.5 mm and 1.5 mm. The shell of the pump can include a circumferentially extending flange, and the weld can extend between the flange and the tubular body of the cover. The groove can have an axial length that is greater than an axial length of the flange. The groove can have an axial length between approximately 7 mm to 11 mm. A ratio of an axial length of the flange to an axial length of the groove can have a range of approximately 0.5 to 1.

The method can include at least partially aligning the flange in an axial direction with the groove, and/or centering the flange along the axial direction with respect to the axial length of the groove.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
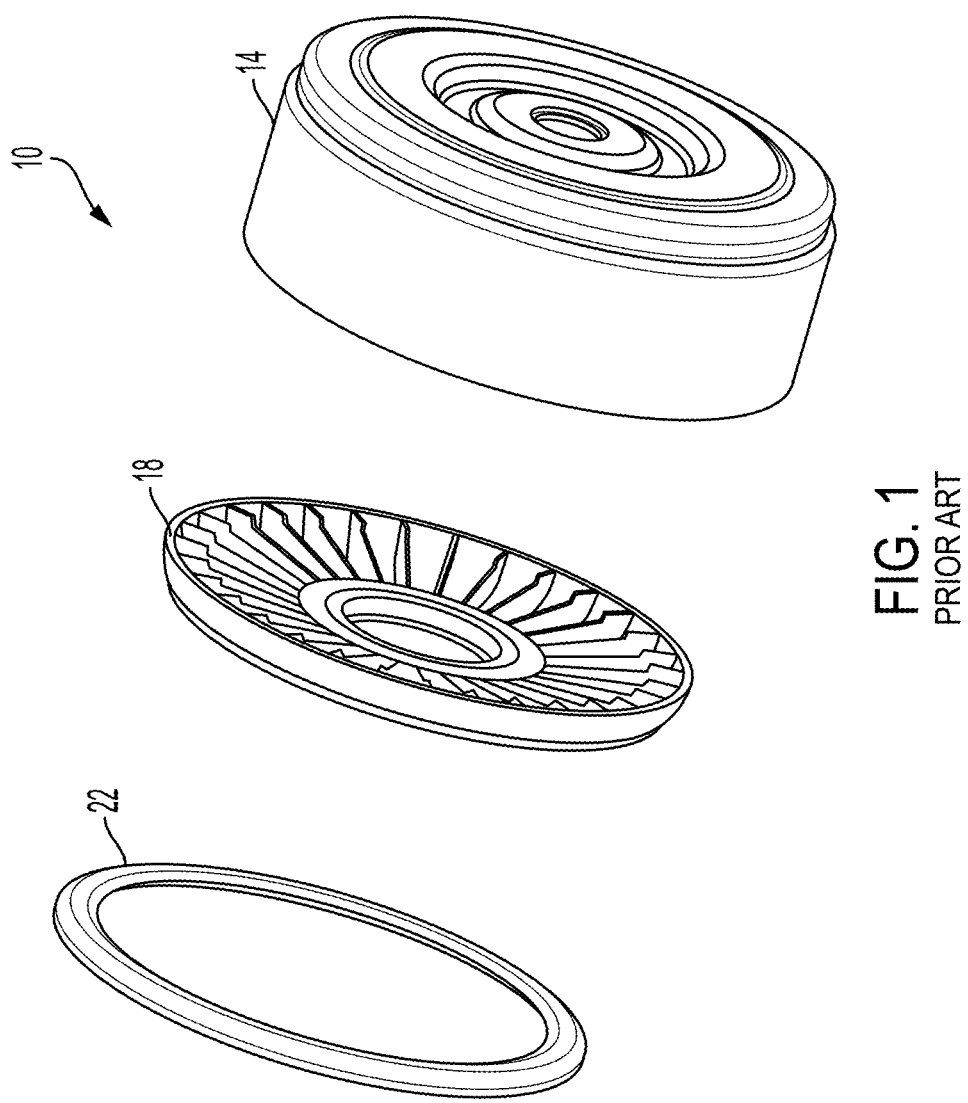
FIG. 1 is a perspective exploded view of certain components of a prior art torque converter assembly.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

In FIG. 1, a simplified prior art torque converter assembly 10 is shown in an exploded state. The simplified torque converter assembly 10 includes a cover 14, a pump 18, and a weld ring 22. The illustrated simplified torque converter assembly 10 includes only the components relevant to the present disclosure, but a person of ordinary skill in the art will recognize that other additional components (not shown), such as a clutch assembly, would typically comprise a complete torque converter assembly 10.

Figure 2:
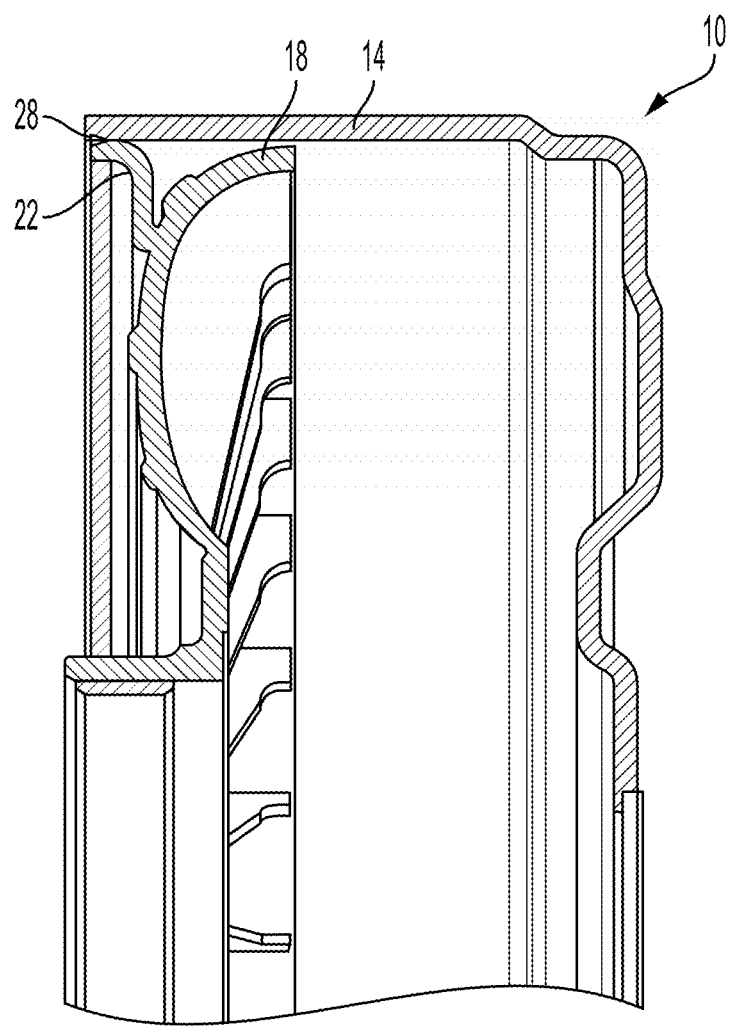
FIG. 2 is a cross-sectional view of the components of the torque converter assembly of FIG. 1 in an assembled state.
Figure 3:
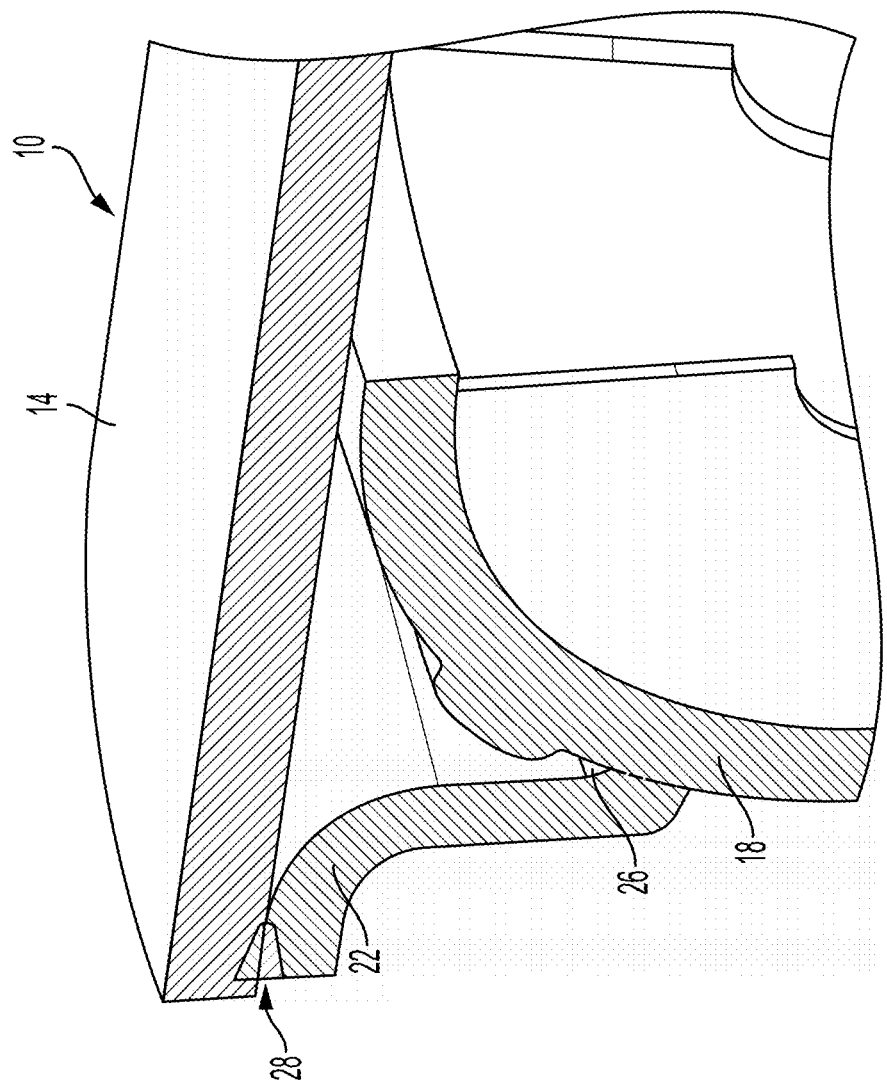
FIG. 3 is a perspective view of an enlarged portion of FIG. 2.

In FIGS. 2 and 3, it will be appreciated that the prior art simplified torque converter assembly 10 is assembled typically by first MIG welding the weld ring 22 to the pump 18 with weld 26, and then positioning the pump 18 and weld ring 22 within the cover 14. The weld ring 22 is then joined to the cover 14 by weld 28.

Figure 4:
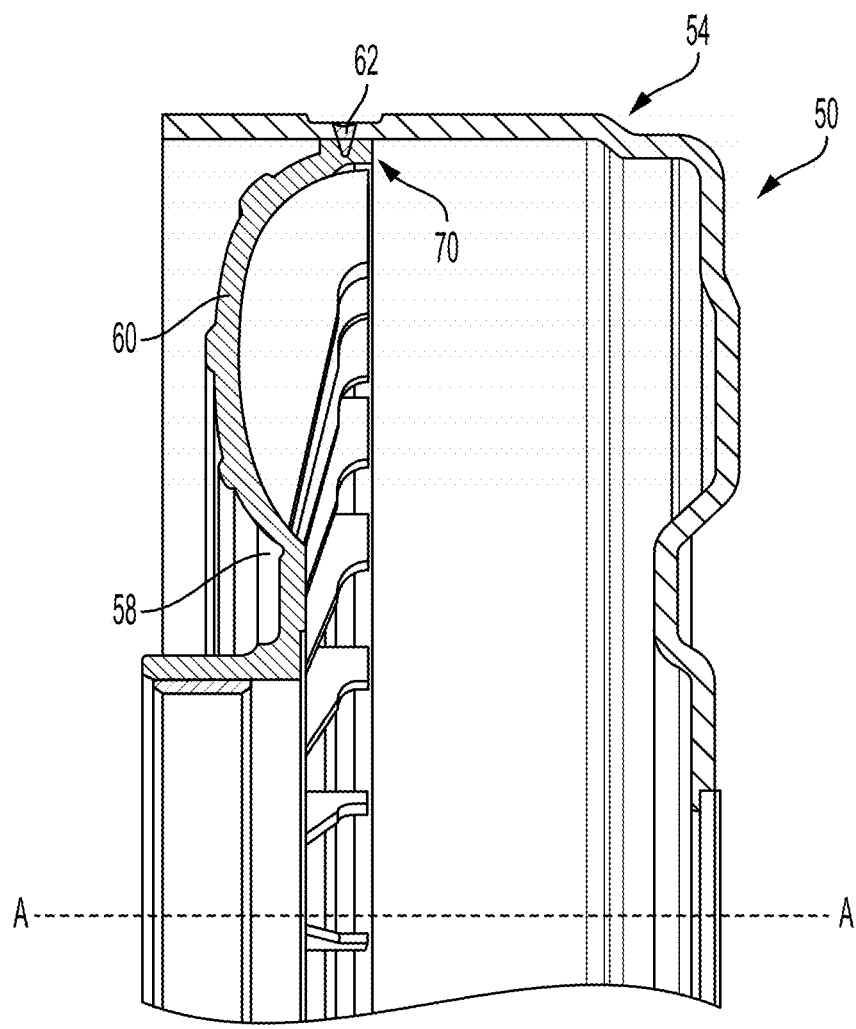
FIG. 4 is a cross-sectional view of an exemplary torque converter assembly in accordance with the present disclosure.
Figure 5:
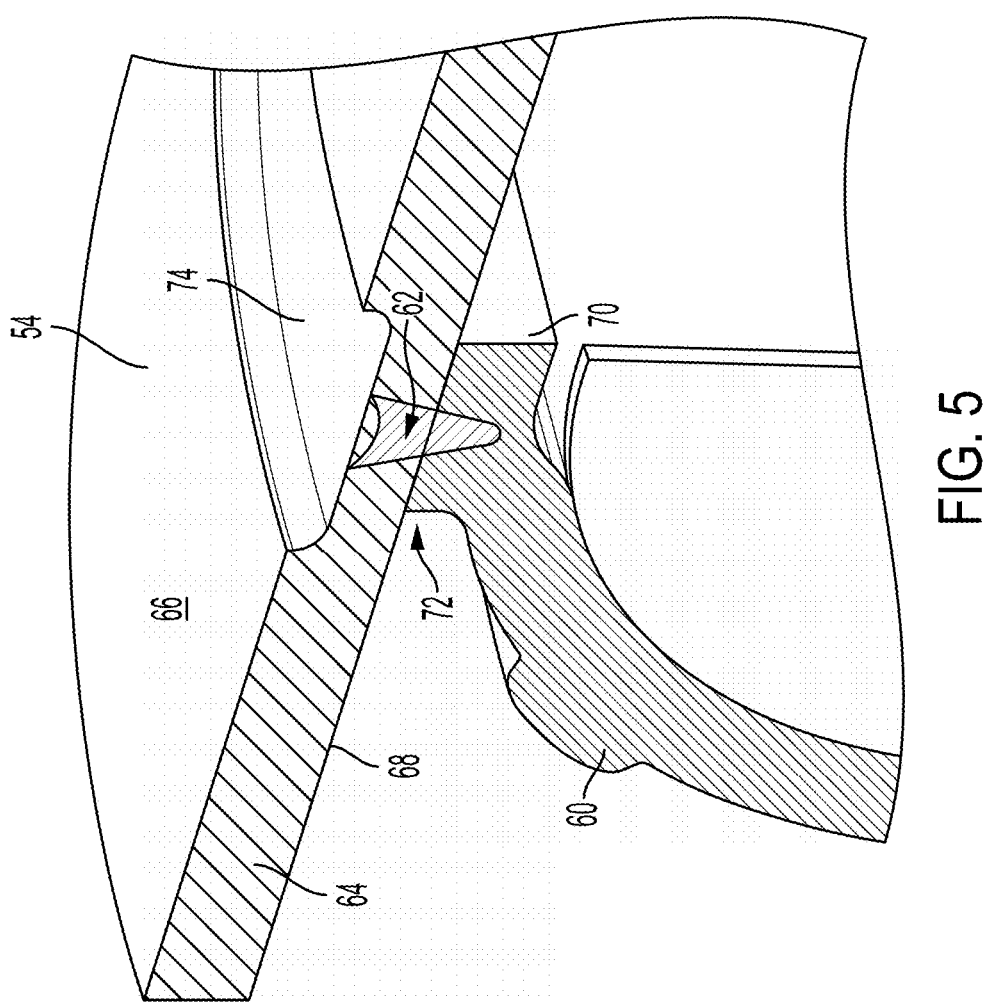
FIG. 5 is a perspective view of an enlarged portion of FIG. 4.

Turning to FIGS. 4 and 5, certain components of an exemplary torque converter assembly in accordance with the present disclosure are illustrated. The torque converter assembly is identified generally by reference numeral 50 and includes a cover 54 and a pump 58 having a shell or housing 60. Unlike the torque converter assembly 10 of FIGS. 1-3, in FIGS. 4 and 5 a weld ring is not present and the pump 58 is welded directly to the cover 54 via weld 62. The illustrated torque converter assembly 50 includes only the components relevant to the present disclosure, but a person of ordinary skill in the art will recognize that other additional components (not shown), such as a clutch assembly, pump blades and core, etc. would typically comprise a complete torque converter assembly 10. Thus, it will be appreciated that the pump shell generally defines an interior volume in which pump blades are supported for torque transfer.

The cover 54 includes a generally tubular body 64 having a radially outer surface 66 and a radially inner surface 68. The shell 60 of the pump 58 includes a circumferentially extending flange 70 having a radially outer surface 72 adapted to abut the radially inner surface 68 of the cover 54. The radially outer surface 66 of the cover 54 includes a circumferential groove or undercut 74 having a length in an axial direction (A-A in FIG. 4) of approximately the axial length of the flange 70. In one example, the undercut 74 has a depth of between approximately 0.5 mm and 1.5 mm, and in one arrangement is approximately 0.95 mm, and an axial length of between approximately 7 mm and 11 mm, and in one arrangement is approximately 9 mm, while the flange 70 has an axial length of between approximately 4 mm and 8 mm, and in one arrangement approximately 6.3 mm. The flange 70 is generally aligned axially (e.g., coextensive along the axial direction) with the undercut 74. In some examples, a ratio of the axial length of the flange 70 to the axial length of the undercut 74 ranges from approximately 0.5 to 1, and in one arrangement is approximately 0.7. In certain examples, the flange 70 is centered in the axial direction relative to the undercut 74 such that the undercut 74 extends axially beyond each axial end of the flange 70. In some examples, a ratio of the depth of the undercut 74 to a thickness of the cover 54 in the radial direction is between approximately 2 and 4, and in one arrangement is approximately 3.2.

The cover 54 and pump 58 are manufactured as separate components. Typically, an inner diameter of the cover 54 and the radially outer surface 72 of the pump 58 are machined such that the pump 58 is closely received within the cover 54. Accordingly, the flange 70 of the pump 54 can have an initial outside diameter that exceeds an initial inside diameter of the cover 54. The components are then machined for clearance.

To assemble the torque converter assembly 50, the machined pump 58 is positioned within the machined cover 54. The outer diameter of the pump 58 is closely matched to the inner diameter of the cover 54 such that the pump 58 is closely received within the cover 54 with the flange 70 abutting or immediately adjacent the radially inner surface 68 of the cover 54. The weld 62 is then formed to secure the cover 54 to the pump 58. In one example, a laser welding process in used to weld the cover 54 to the pump 58. An exemplary laser weld can be formed by directing laser energy to an interface between the cover 54 and the pump 58 to heat the components and create the weld 62. A wide range of welding techniques can be employed for forming the weld 62 without departing from the scope of the present disclosure.

It should be appreciated that torque converter assemblies are typically configured to be coupled to a prime mover. The illustrated exemplary torque converter assembly 50 is configured to be received at least partially within a housing, such as a housing of an e-motor of an electric vehicle, for example, and operatively coupled thereto for transmitting torque from the e-motor to other drivetrain components of the vehicle. Accordingly, the dimensions of the radially outer surface 66 of the cover 54 should be uniform to ensure proper mating with the housing of the e-motor during subsequent installation. Any deformation resulting from the welding process is therefore contained axially and/or radially within the undercut 74 such that the radially outer surface 66 of the cover 54 maintains its form for mating with the housing of the e-motor.

Aspects of the present disclosure result in improved durability since the stress area is shifted to a larger area as compared to prior assemblies. In addition, deflection of the components has been shown to be reduced.

Having thus described the present embodiments in detail, it is to be appreciated and will be apparent to those skilled in the art that many physical changes, only a few of which are exemplified in the detailed description of the disclosure, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the disclosure being indicated by the appended claims rather than by the foregoing description, and all alternate embodiments and changes to this embodiment which come within the meaning and range of equivalency of said claims are therefore to be embraced therein.

LOG OF REFERENCE NUMERALS 10 torque converter assembly
14 cover
18 pump
22 weld ring
26 pump weld
28 weld
50 torque converter assembly
54 cover
58 pump
60 shell/housing
62 weld
64 tubular body
66 outer surface of cover
68 inner surface of cover
70 flange
72 radially outer surface of flange
74 undercut/groove

What is claimed is:

1. A torque converter assembly comprising:
a cover including a tubular body; and
a pump including a shell, a radially outermost surface of the shell defining a circumferentially extending flange;
wherein the radially outermost surface of the shell of the pump is received in the tubular body of the cover; and
wherein the shell of the pump is joined to the cover with a circumferential weld;
wherein the circumferential weld extends between the flange and the tubular body of the cover;
wherein a radially outer surface of the tubular body of the cover includes a circumferentially extending groove, and wherein the circumferential weld is at least partially aligned in an axial direction with the groove.

2. The torque converter assembly according to claim 1, wherein the groove has a depth in a radial direction of between 0.5 mm and 1.5 mm.

3. The torque converter assembly according to claim 1, wherein the flange is at least partially aligned in the axial direction with the groove.

4. The torque converter assembly according to claim 3, wherein the groove has an axial length that is greater than an axial length of the flange.

5. The torque converter assembly according to claim 4, wherein the flange is centered axially with respect to the axial length of the groove.

6. The torque converter assembly according to claim 5, wherein the groove has an axial length between approximately 7 mm to 11 mm.

7. The torque converter assembly according to claim 1, wherein a ratio of the axial length of the flange to the axial length of the groove has a range of approximately 0.5 to 1.

8. A method of making a torque converter assembly, the method comprising:
- providing a cover including a tubular body having a circumferentially extending groove in a radially outer surface of the tubular body of the cover;
- providing a pump including a shell, a radially outermost surface of the shell defining a circumferentially extending flange;
- machining at least one of an inside diameter of the tubular body or the outer diameter of the shell of the pump;
- positioning the radially outermost surface of the shell of the pump in the tubular body of the cover; and
- joining the shell of the pump to the cover by welding to form a weld therebetween;
- wherein the circumferential weld extends between the flange and the tubular body of the cover and at least partially aligned in an axial direction with the groove.

9. The method according to claim 8, wherein the groove has a depth in a radial direction of the groove of between 0.5 mm and 1.5 mm.

10. The method according to claim 8, further comprising at least partially aligning the flange in an axial direction with the groove.

11. The method according to claim 10, wherein the groove has an axial length that is greater than an axial length of the flange.

12. The method according to claim 11, wherein the flange is centered axially with respect to the axial length of the groove.

13. The method according to claim 8, wherein the groove has an axial length between approximately 7 mm to 11 mm.

14. The method according to claim 8, wherein a ratio of an axial length of the flange to an axial length of the groove has a range of approximately 0.5 to 1.

* * * * *